(12) United States Patent
Yonemura et al.

(10) Patent No.: US 8,785,061 B2
(45) Date of Patent: Jul. 22, 2014

(54) CO CONVERSION CATALYST FOR USE IN FUEL CELL IN DSS OPERATION, METHOD FOR PRODUCING THE SAME, AND FUEL CELL SYSTEM

(75) Inventors: Masanao Yonemura, Hiroshima (JP); Toshinobu Yasutake, Hiroshima (JP); Tetsuya Shishido, Kyoto (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 957 days.

(21) Appl. No.: 12/413,716

(22) Filed: Mar. 30, 2009

(65) Prior Publication Data
US 2009/0317672 A1      Dec. 24, 2009

(30) Foreign Application Priority Data

Jun. 24, 2008 (JP) ................................ 2008-164794

(51) Int. Cl.
*H01M 8/06* (2006.01)
*B01J 23/32* (2006.01)
*B01J 23/72* (2006.01)
*B01J 23/70* (2006.01)

(52) U.S. Cl.
USPC ........... 429/408; 502/346; 502/324; 502/331; 502/318

(58) Field of Classification Search
None
See application file for complete search history.

(56) References Cited

U.S. PATENT DOCUMENTS 4,308,176 A * 12/1981 Kristiansen ................... 502/342
2004/0127586 A1 * 7/2004 Jin et al. ........................ 518/715

FOREIGN PATENT DOCUMENTS

| JP | 2004-216369 A | 8/2004 | |
| JP | 2005034682 A * | 2/2005 | ............... B01J 23/72 |
| JP | 2005-131471 A | 5/2005 | |
| JP | 2006-252929 A | 9/2006 | |

* cited by examiner

*Primary Examiner* — Melvin C Mayes
*Assistant Examiner* — Michael Forrest
(74) *Attorney, Agent, or Firm* — Westerman, Hattori, Daniels & Adrian, LLP

(57) ABSTRACT

To provide a CO conversion catalyst for use in a fuel cell in a DSS operation, which includes a Cu—Al-Ox catalyst, in which the Cu—Al-Ox catalyst has a boehmite phase formed in at least a part of the Cu—Al-Ox catalyst. The CO conversion catalyst has an improved degree of dispersion of Cu metal by the boehmite phase formed therein, and hence can be prevented from sintering of copper caused due to steam, thereby achieving improved durability with respect to the function as the CO conversion catalyst.

11 Claims, 14 Drawing Sheets

BOEHMITE AlO(OH) STRUCTURE

CHANGE IN Cu-Cu COORDINATION NUMBER

| CP | CN | R/Å | DW/×10⁻²Å⁻² |
|---|---|---|---|
| AFTER INITIAL REACTION | 9.8 | 2.52 | 11.9 |
| DSS at 323 K | 3.4 | 2.53 | 9.6 |
| DSS at 473 K | 1.3 | 2.50 | 10.6 |
| AFTER RE-REACTION | 9.8 | 2.52 | 11.3 |

| IMP | CN | R/Å | DW/×10⁻²Å⁻² |
|---|---|---|---|
| AFTER INITIAL REACTION | 8.9 | 2.52 | 10.6 |
| DSS at 323 K | 5.8 | 2.54 | 9.4 |
| DSS at 473 K | 5.2 | 2.53 | 10.3 |
| AFTER RE-REACTION | 11.2 | 2.56 | 11.9 |

CN; COORDINATION NUMBER, R; BOND LENGTH, DW; THE DEBYE-WALLER FACTORE

CO CONVERSION CATALYST FOR USE IN FUEL CELL IN DSS OPERATION, METHOD FOR PRODUCING THE SAME, AND FUEL CELL SYSTEM

BACKGROUND OF THE INVENTION

1. Field of the Invention

The present invention relates to a carbon monoxide (CO) conversion catalyst (CO shift catalyst) for removing carbon monoxide from hydrogen-containing gas, which is a reformer catalyst for PEFC used in a reformer for producing hydrogen, a method for producing a CO conversion catalyst, and a fuel cell system.

2. Description of the Related Art

A polymer electrolyte fuel cell (PEFC) is a low-pollution cell and has a high thermal efficiency, and hence is recently expected to be applied to a power source in a wide variety of fields, such as a power source for automobile and a dispersed power system. In this fuel cell system, hydrogen ($H_2$) is produced by reforming a hydrocarbon fuel (such as city gas, methane, propane, kerosine, or dimethyl ether) by a reformer (see (I) reforming reaction shown below).

The reformed gas obtained by reforming using a reformer contains carbon monoxide (CO) and carbon dioxide ($CO_2$) in addition to hydrogen ($H_2$), and carbon monoxide (CO) poisons platinum which is mainly used as an electrocatalyst for the fuel cell. Therefore, a method for reducing the concentration of carbon monoxide (CO) in the gas obtained by reforming is employed in which the method includes a CO shift reaction performed in a CO conversion device using a CO conversion catalyst and a CO oxidation reaction performed in a CO removing device using a CO removing catalyst (see (II) CO shift reaction and (III) CO partial oxidation reaction shown below).

I) Reforming Reaction

$$CH_4 + H_2O \rightarrow 3H_2 + CO \quad (1)$$

$$CH_4 + \tfrac{1}{2}O_2 \rightarrow 2H_2 + CO \quad (2)$$

II) CO Shift Reaction

$$CO + H_2O \rightarrow CO_2 + H_2 \quad (3)$$

III) CO Partial Oxidation Reaction (CO Removal Reaction)

$$CO + \tfrac{1}{2}O_2 \rightarrow CO_2 \quad (4)$$

$$H_2 + \tfrac{1}{2}O_2 \rightarrow H_2O \quad (5)$$

For steadily reducing the carbon monoxide (CO) contained in the reformed gas obtained by reforming using a reformer, the CO conversion catalyst is required to have high selectivity and high reactivity. Therefore, a noble metal catalyst including platinum (Pt) has been used as a CO conversion catalyst (see Japanese Patent Application Laid-open No. 2005-131471 and Japanese Patent Application Laid-open No. 2004-216369).

The noble metal catalyst including platinum (Pt) has such high activity that it can steadily reduce the carbon monoxide (CO) concentration. However, the noble metal catalyst is expensive and hence increases the cost of producing CO conversion catalysts, making it difficult to reduce the cost for polymer electrolyte fuel cell (PEFC) system.

To solve the above problem, a copper (Cu) catalyst, such as a Cu/Zn catalyst, has been proposed (see Japanese Patent Application Laid-open No. 2006-252929).

The copper catalyst is inexpensive as compared to a noble metal catalyst, however, the copper catalyst has a problem that it is adversely affected by steam or the like and it is poor in activity and durability.

Particularly in a daily startup and shutdown (DSS) operation in which startup and shutdown are performed frequently, a problem arises that the activity of the CO conversion catalyst is remarkably lowered.

FIG. 18 is a schematic diagram for explaining a change of a state of water as the temperature of a catalyst layer is increased or lowered. As shown in FIG. 18, for example, in a DSS operation, water ($H_2O$) at about 50° C. is in a liquid state. After the start of operation, the temperature of the catalyst layer is increased to, for example, 200° C. With respect to the Cu catalyst, such as Cu/Zn catalyst, when the temperature of the catalyst layer has reached, for example, about 100° C., copper (Cu) constituting the Cu/Zn catalyst undergoes a steam oxidation represented by the formula (6) below, causing sintering of copper (Cu).

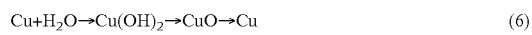

$$Cu + H_2O \rightarrow Cu(OH)_2 \rightarrow CuO \rightarrow Cu \quad (6)$$

When the temperature of the catalyst layer has reached, for example, about 200° C. and then the operation is stopped and the temperature is lowered to 50° C., for example, the CO conversion device is shut off from the outside and a temperature difference of about 150 to 200° C. is caused, so that a change in a volume of a gas is caused in the CO conversion device. As a result, air in the external atmosphere goes into the CO conversion device, thus forming a mixture of air and water in the CO conversion device.

As described above, a conventional Cu/Zn catalyst has the following problem. As the temperature is increased and lowered repeatedly, as shown in FIG. 19, vaporization of liquid water causes oxidation, and the reformed gas causes reduction of copper oxide (CuO) and heat generation, so that sintering of copper occurs to cause grain growth, lowering the catalyst in activity.

Therefore, there has been strongly desired the development of a CO conversion catalyst for fuel cell, which catalyst uses an inexpensive copper catalyst and has high durability, and is advantageous in that sintering of copper can be prevented even when the catalyst is used in a fuel cell in a DSS operation.

SUMMARY OF THE INVENTION

It is an object of the present invention to at least partially solve the problems in the conventional technology.

According to an aspect of the present invention, a carbon monoxide conversion catalyst for use in a fuel cell in a daily startup and shutdown operation includes a Cu—Al-Ox catalyst which includes a boehmite phase formed in at least a part of the Cu—Al-Ox catalyst.

Advantageously, in the CO conversion catalyst, the Cu—Al-Ox catalyst is formed by any one of a homogeneous precipitation method, a coprecipitation method, and a sol-gel method, and then treated with steam-containing gas.

Advantageously, in the CO conversion catalyst, the Cu—Al-Ox catalyst has a Cu:Al molar ratio of 4:1 to 1:4.

Advantageously, the CO conversion catalyst further includes, as an active component, at least one member selected from a group consisting of Mn, Fe, Co, Cr, and Ni.

Advantageously, in the CO conversion catalyst, the Cu—Al-Ox catalyst is calcined at a temperature of 300 to 600° C.

Advantageously, in the CO conversion catalyst, the Cu—Al-Ox catalyst is amorphous.

According to another aspect of the present invention, a method for producing a carbon monoxide conversion catalyst for use in a fuel cell in a daily startup and shutdown operation includes: forming a Cu—Al-Ox catalyst precursor; calcining the Cu—Al-Ox catalyst precursor at 300 to 600° C. to form a Cu—Al-Ox catalyst; and treating the Cu—Al-Ox catalyst with steam-containing gas to form a boehmite phase in at least a part of the Cu—Al-Ox catalyst.

Advantageously, in the method, the Cu—Al-Ox catalyst is formed by any one of a homogeneous precipitation method, a coprecipitation method, and a sol-gel method, and then treated with steam-containing gas.

Advantageously, in the method, the Cu—Al-Ox catalyst has a Cu:Al molar ratio of 4:1 to 1:4.

Advantageously, in the method, further includes, including, as an active component, at least one member selected from a group consisting of Mn, Fe, Co, Cr, and Ni.

According to still another aspect of the present invention, a fuel cell system in a daily startup and shutdown operation using a hydrocarbon fuel includes: reformer that reforms the hydrocarbon fuel to produce a reformed gas; any one of the above described Co conversion catalyst for removing carbon monoxide from the reformed gas; and a fuel cell that generates electricity.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings. The present invention is not limited to the embodiments. In addition, constituent elements in the embodiments include those that can be easily assumed by those skilled in the art or that are substantially equivalent.

A CO conversion catalyst according to a first embodiment of the present invention is used in a fuel cell in a DSS operation, which includes a Cu—Al-Ox catalyst, in which the Cu—Al-Ox catalyst has a boehmite phase formed in at least a part of the Cu—Al-Ox catalyst.

Figure 1:
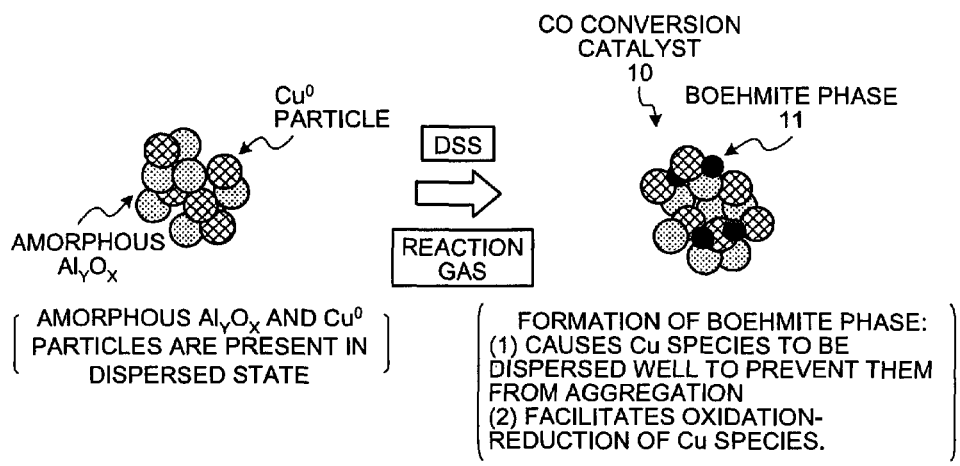
FIG. 1 is a conceptual diagram of a CO conversion catalyst according to the present invention.

FIG. 1 is a conceptual diagram of a CO conversion catalyst according to the present invention. As shown in FIG. 1, in a CO conversion catalyst 10 according to the first embodiment, a catalyst having amorphous $Al_yO_x$ and $Cu^0$ (metal) particles dispersed therein, which is formed by calcining a catalyst precursor obtained by a coprecipitation method, is treated with gas containing steam to form a boehmite phase 11 in a part of the catalyst, so that Cu species are dispersed well, preventing the occurrence of Cu aggregation. Further, the Cu species easily undergo oxidation-reduction.

The catalyst is prevented from suffering sintering of copper, thereby achieving high stability.

Figure 19:
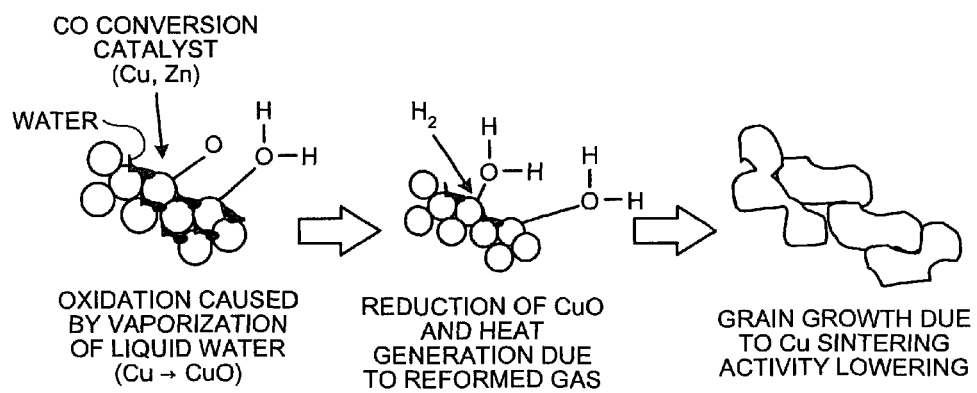
FIG. 19 is a schematic diagram of a process in which sintering occurs in a CO conversion catalyst due to Cu oxidation.

By the boehmite phase 11 formed in the catalyst, the Co conversion catalyst 10 according to the present invention used in a DSS operation is prevented from grain growth, which is caused due to the sintering shown in FIG. 19, so that a lowering of the catalytic activity is prevented.

Figure 2:
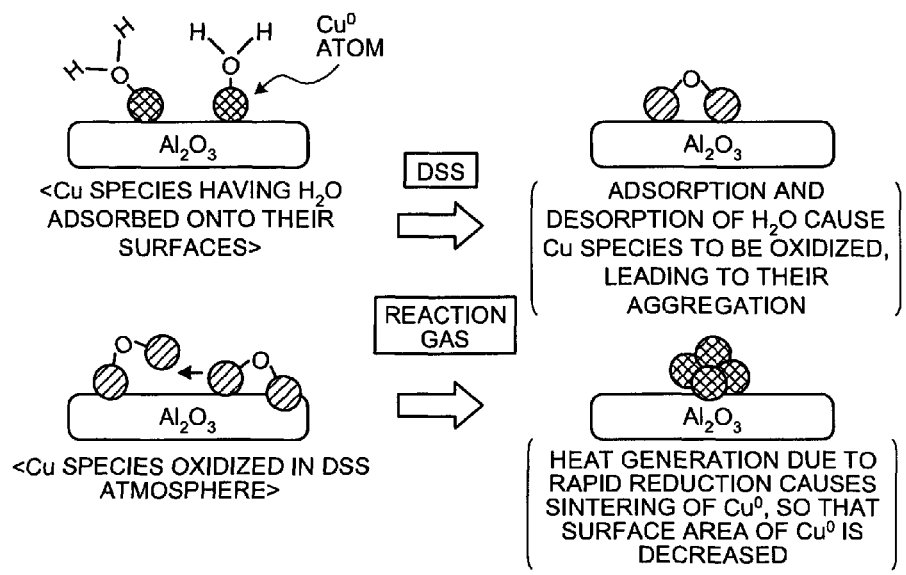
FIG. 2 is a conceptual diagram of a CO conversion catalyst according to a conventional technique.

In contrast, as shown in FIG. 2, with respect to the conventional CO conversion catalyst obtained by an impregnation method, copper ($Cu^0$; zero-valent) presented on alumina ($Al_2O_3$) constituting the CO conversion catalyst changes into copper oxide (CuO; bivalent) in a DSS operation, and undergoes a rapid reduction in a reductive atmosphere for CO shift reaction to generate heat, causing sintering of Cu and then grain growth, so that the catalytic activity is lowered.

It is preferred that the CO conversion catalyst 10 is produced by a coprecipitation method.

The CO conversion catalyst according to the present invention prepared by a coprecipitation method is in the form of an oxide of Cu, and the catalyst having an amorphous structure is obtained by calcining a precursor having a crystal structure.

With respect to the method for forming the Cu—Al-Ox catalyst, for example, a catalyst precursor is formed by a coprecipitation (CP) method, a homogeneous precipitation (HP) method, or a sol-gel (SG) method, and then treated with steam-containing gas to form a boehmite phase in at least a part of the catalyst.

The coprecipitation method (CP method) is a method in which copper nitrate trihydrate as a Cu source and aluminum nitrate nonahydrate as an Al source are dissolved in water in respectively predetermined amounts, and then the resultant solution is droped to an aqueous sodium carbonate solution while stirring, followed by maturing, drying, and calcination, to obtain a Cu—Al-Ox catalyst.

The homogeneous precipitation (HP) method is a method in which copper nitrate trihydrate as a Cu source and aluminum nitrate nonahydrate as an Al source are added to an aqueous urea solution in respectively predetermined amounts, and then the resultant mixture is heated and matured under reflux to cause a precipitate, and the resultant precipitate is washed, dried, and calcined to obtain a Cu—Al-Ox catalyst.

The sol-gel method (SG method) is a method in which copper nitrate trihydrate as a Cu source and aluminum nitrate nonahydrate as an Al source are dissolved in respectively predetermined amounts in water containing a reaction promoter, and then aqueous ammonia is added to the resultant solution, followed by reduced-pressure drying and calcination, to obtain a Cu—Al-Ox catalyst.

In the CO conversion catalyst 10, the Cu to Al molar ratio (Cu/Al) is preferably 4/1 to 1/4, and further preferably 1/2 to 1/3.

In the CO conversion catalyst 10, Cu and Al are adjacent to each other and form together an amorphous structure to exhibit their performance. When the CO conversion catalyst has a Cu/Al molar ratio falling outside of the above range, Cu or Al is present separately, so that they cannot exhibit their performance.

In the CO conversion catalyst 10, a precursor of Cu and Al is formed using nitrates or acetates respectively containing Cu and Al.

In the CO conversion catalyst 10, it is presumed that a boehmite phase is formed to increase the specific surface area.

In the CO conversion catalyst 10, the boehmite phase has an anchoring effect-like action for aggregation of Cu, making it possible to suppress the occurrence of sintering of Cu caused due to oxidation of Cu, which occurs in a conventional catalyst produced by an impregnation method as shown in FIG. 2. Therefore, even when the CO conversion catalyst is used in a DSS operation, the occurrence of grain growth caused by sintering due to oxidation of copper (Cu; zerovalent) can be suppressed, preventing the lowering of the catalytic activity. In addition, almost no change of the size of Cu particles is caused in the catalyst, and therefore the catalyst can keep the contact area with gas constant.

The CO Conversion catalyst 10 can further contain, as an active component, at least one member selected from the group consisting of Mn, Fe, Co, Cr, and Ni.

The CO conversion catalyst contains Cu and Al, i.e., inexpensive elements only, and further can be produced without using complicated steps for production process, and therefore can be reduced in production cost to a level as low as the cost for a catalyst currently commercially available.

<Method for Producing CO Conversion Catalyst>

The method for producing a CO conversion catalyst containing Cu—Al prepared by a coprecipitation method is described below in detail with reference to the flowchart of FIG. 3.

Figure 3:
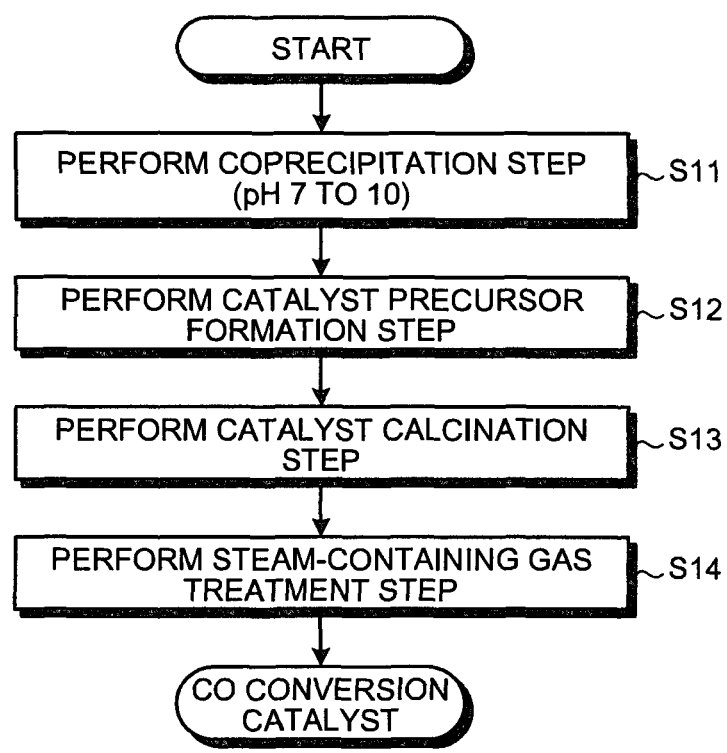
FIG. 3 is a flowchart of a method for producing a CO conversion catalyst.

As shown in FIG. 3, the method for producing a CO conversion catalyst according to the first embodiment includes a coprecipitation step of precipitating Cu and Al in a solution, a precursor formation step of forming a catalyst precursor having Cu and Al, a catalyst calcination step of calcining the obtained catalyst precursor, and a steam-containing gas treatment step of forming a boehmite phase.

<Coprecipitation Step (Step S11)>

At Step S11, solutions of respective nitrates of Cu and Al are individually dropped to ion-exchanged water and dissolved by stirring, and a precipitant for the coprecipitation method is added to the resultant solution to precipitate Cu and Al.

With respect to the precipitant for the coprecipitation method, an alkaline substance, such as sodium carbonate, sodium hydroxide, or ammonia, is advantageously used, and a 10 wt % sodium carbonate solution is used in the first embodiment.

In the precipitation method, solutions of respective nitrates of Cu and Al are individually dropped to a solution of a precipitant to effect precipitation. Instead of the nitrate solutions, solutions of respective acetates of Cu and Al can be used.

The pH for the precipitation is advantageously 7.0 to 10.0, preferably about 9.0, and the precipitation temperature is advantageously room temperature.

<Catalyst Precursor Formation Step (Step S12)>

At Step S12, after the coprecipitation step (Step S11), the solution in which Cu and Al are precipitated is matured to form a precursor.

In this maturing, the maturing temperature is higher than room temperature, and is preferably about 60±30° C., more preferably about 60±20° C., which varies depending on the maturing time. The maturing time is advantageously 10 to 40 hours at 60° C.

The maturing improves the precursor in quality.

<Catalyst Calcination Step (Step S13)>

At Step S13, the obtained catalyst precursor is collected by filtration and dried, and then calcined at about 550° C. to give a CO conversion catalyst.

The calcination temperature is preferably 300 to 600° C., further preferably 300 to 550° C. When the calcination temperature is lower than 300° C., the degree of sintering of Cu and Al in the calcined product is poor, so that the calcined product cannot function as a catalyst. On the other hand, when the calcination temperature is up to about 600° C., an amorphous structure of Cu and Mn is formed, however, when the calcination temperature is higher than 600° C., an oxide of Cu and Mn is disadvantageously formed.

<Steam-containing Gas Treatment (Boehmite Forming Treatment) Step (Step S14)>

The calcined CO conversion catalyst is exposed to a temperature of 50 to 250° C. in a saturated steam atmosphere at 70° C. or higher to form a boehmite phase in a part of the amorphous catalyst.

A catalyst of an amorphous CO conversion catalyst having a boehmite phase formed in a part thereof can be obtained.

The method of the present invention uses inexpensive elements, such as Cu and Al, as active components of the catalyst, and includes no complicated steps for production process, and therefore can reduce the production cost for catalyst to a level as low as the cost for a catalyst currently commercially available.

Further, the CO conversion catalyst according to the first embodiment can be remarkably improved in activity and durability, as compared to a Cu catalyst produced using an impregnation method.

[Test Examples]

Examples of tests conducted for confirming the effect of the present invention are described below.

Figure 4:
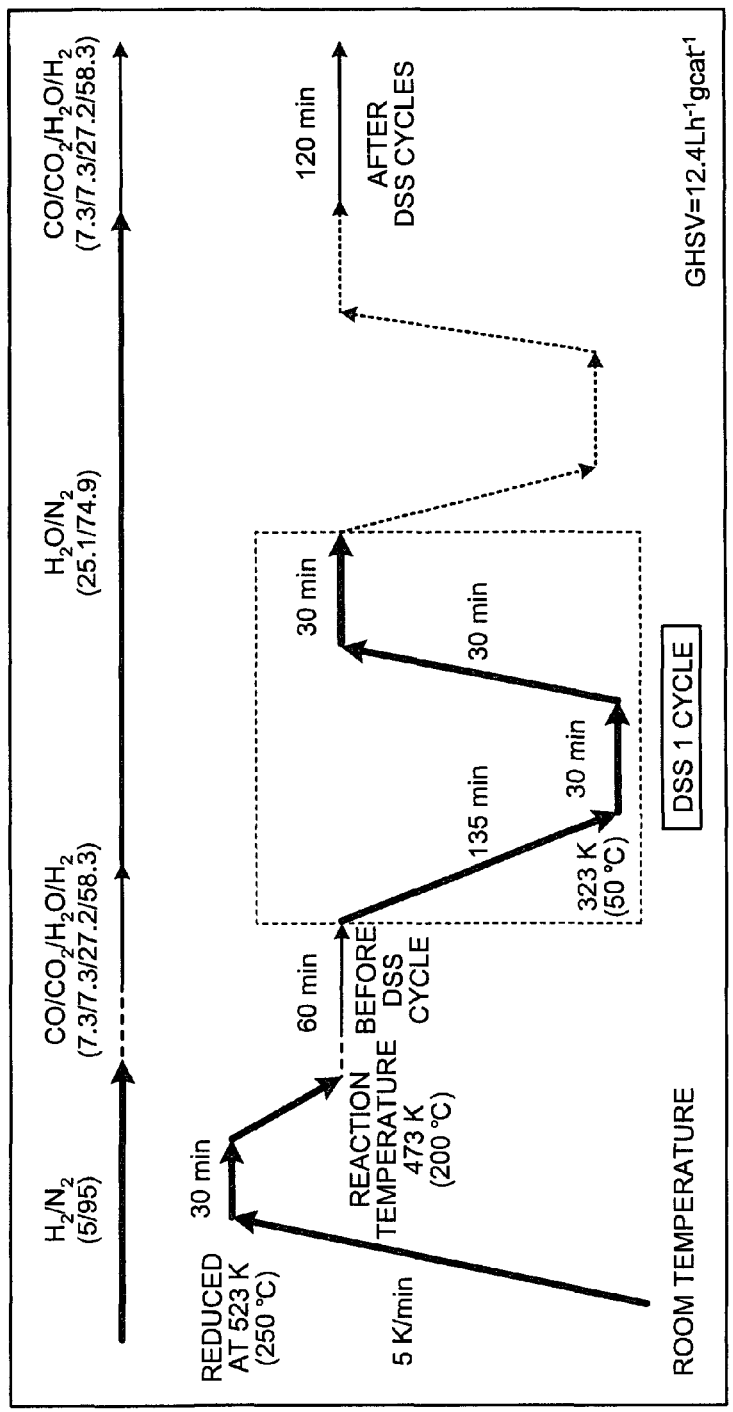
FIG. 4 is a chart of conditions for a startup and shutdown operation used in an experiment of the present invention.

FIG. 4 is a chart of the conditions for a startup and shutdown operation used in the test.

The temperature was first increased from room temperature to 250° C. in an $H_2/N_2$ atmosphere and maintained at 250° C. for 30 minutes, and then lowered to 200° C., and a reaction was conducted in a $CO/CO_2/H_2O/H_2$ atmosphere for 60 minutes. The temperature was then lowered to 50° C. in $H_2O/N_2$ and maintained at 50° C. for 30 minutes, and then increased to 200° C. and maintained at 200° C. for 30 minutes. "DSS 1 cycle" designates a series of increasing the temperature from 50 to 200° C. and lowering the temperature from 200 to 50° C.

The CO shift reaction was conducted in an atmospheric-pressure fixed-bed flow reactor, and the catalytic activity was evaluated using a CO conversion ratio.

The catalysts used in the test were produced using the following methods.
1) CP catalyst using a coprecipitation method (CP method)
2) HP catalyst using a homogeneous precipitation (HP) method
3) SG catalyst using a sol-gel method (SG method)
4) IMP catalyst using an impregnation method (IMP method)

A CP catalyst using a coprecipitation method was produced by the method for producing a CO conversion catalyst shown in FIG. 3.

An HP catalyst using a homogeneous precipitation method is produced by a catalyst preparation method using, as a precipitant, ammonia formed by hydrolysis of urea represented by the following formula (7).

$$(NH_4)2CO+3H_2O \rightarrow 2NH_3+2H_2O+CO_2 \quad (7)$$

First, solutions of respective nitrates of Cu and Al are individually dropped into ion-exchanged water and dissolved by stirring, and urea in an excess amount relative to the metal salts (urea/metal salts molar ratio: 4.0 to 30) is added to and dissolved in the resultant solution.

The solution is then maintained at 90° C. under reflux for 24 hours while stirring so that ammonia as a precipitant is formed by hydrolysis represented by the formula (7) above, precipitating Cu and Al.

At Step S13, the obtained catalyst precursor was collected by filtration and dried, and then calcined at about 550° C. to obtain a CO conversion catalyst.

The calcination temperature is preferably 300 to 600° C., further preferably 300 to 550° C. When the calcination temperature is lower than 300° C., the degree of sintering of Cu and Al in the calcined product is poor, so that the calcined product cannot function as a catalyst.

An SG catalyst using a sol-gel method was produced as follows. Respective citric acid solutions of Cu and Al were first individually prepared.

Citric acid was dissolved in ion-exchanged water, and then ethylene glycol was added to the resultant solution and stirred well, and then a predetermined amount of a solution of a nitrate of Cu is dropped to the mixture and dissolved by stirring to obtain solution 1.

Separately, citric acid was dissolved in ion-exchanged water, and then ethylene glycol was added to the resultant solution and stirred well, and then a predetermined amount of a solution of a nitrate of Al is dropped to the mixture and dissolved by stirring to obtain solution 2.

A 4N aqueous ammonia was then prepared.

The 4N aqueous ammonia was then added to the citric acid solutions of Cu and Al. Specifically, 100 milliliters of solution 1 and 200 milliliters of solution 2 were placed in a 500-mL beaker, and the 4N aqueous ammonia was added to the beaker while stirring, so that the pH of the solution became 9 in about 90 minutes. While reducing the pressure at 40 Torr by a vacuum pump, the solution was then concentrated at 343 to 353 k using a rotary evaporator to prepare a sol. The resultant sol was dried, and then calcined at about 550° C. to obtain a CO conversion catalyst.

The calcination temperature is preferably 300 to 600° C., further preferably 300 to 550° C. When the calcination temperature is lower than 300° C., the degree of sintering of Cu and Al in the calcined product is poor, so that the calcined product cannot function as a catalyst.

An IMP catalyst using an impregnation method (IMP method) was produced as follows. A solution of a nitrate of Cu was first dropped to and dissolved in ion-exchanged water in a small amount. γ-Alumina was added to the resultant solution and stirred at room temperature for 4 hours. The sample was then subjected to evaporation to dryness. The resultant sample was dried, and then calcined at about 550° C. to obtain a CO conversion catalyst.

The calcination temperature is preferably 300 to 600° C., further preferably 300 to 550° C. When the calcination temperature is lower than 300° C., the degree of sintering of Cu and Al in the calcined product is poor, so that the calcined product cannot function as a catalyst.

Figure 5:
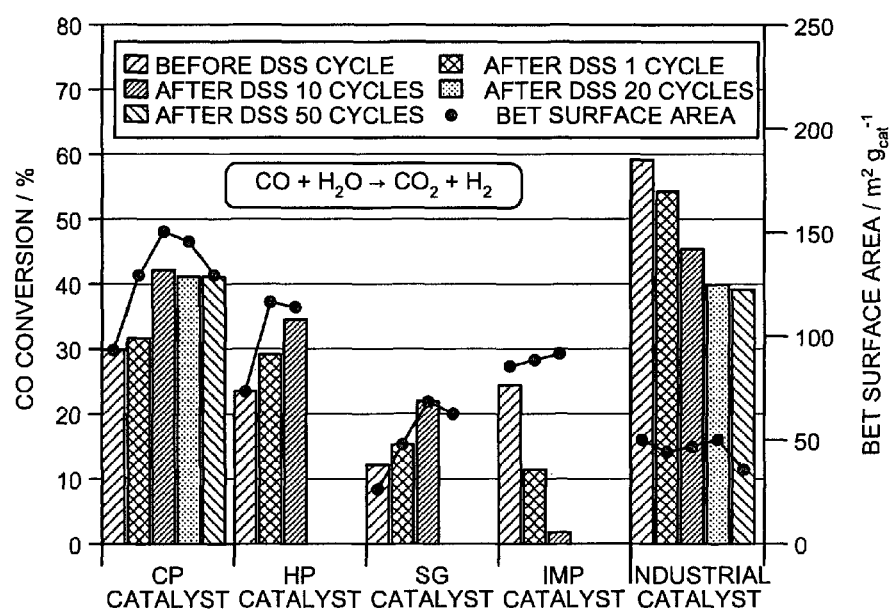
FIG. 5 is a graph of a relationship between the number of DSS cycles and a CO conversion ratio or a specific surface area for each catalyst.

FIG. 5 is a graph of the relationship between the number of DSS cycles in FIG. 4 and a CO conversion ratio or a specific surface area for each catalyst.

As shown in FIG. 5, for each of the CP catalyst using a coprecipitation method (CP method), the HP catalyst using a homogeneous precipitation (HP) method, and the SG catalyst using a sol-gel method (SG method), a characteristic behavior was found in which the activity was improved as the DSS treatment was performed repeatedly.

In contrast, with respect to the industrial Cu/Zn/Al catalyst ("MDC-7" (trade name) manufactured by Sud-Chemie Catalysts Japan, Inc.), such a behavior was not found. The catalyst using a CP method exhibited the most excellent properties.

With respect to the IMP catalyst using an impregnation method, the conversion ratio was drastically reduced as the number of DSS cycles was increased. This reduction of conversion ratio is caused due to sintering.

Figure 6A:
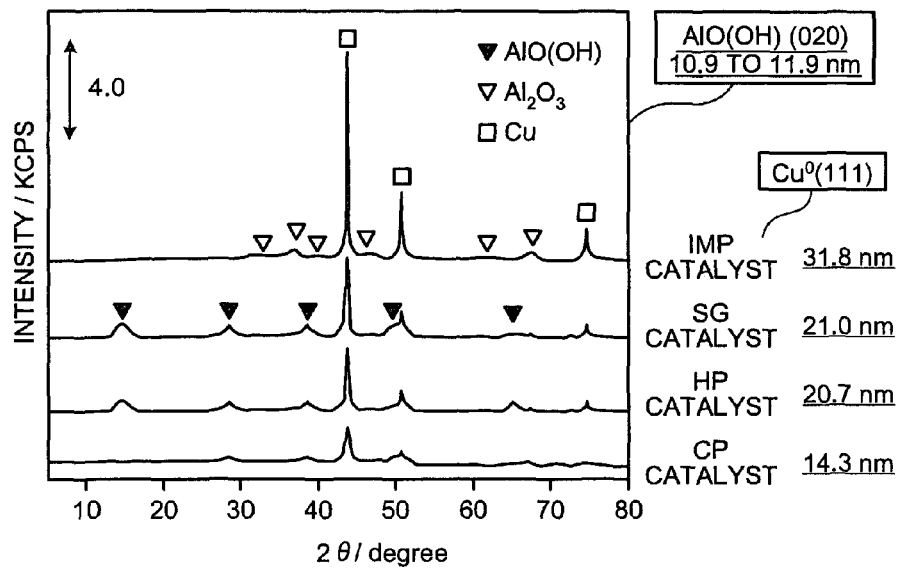
FIG. 6A depicts XRD patterns of respective catalysts after ten cycles of DSS treatment.

FIG. 6A depicts XRD patterns of the respective catalysts after ten cycles of DSS treatment. In FIG. 6A, a solid triangle denotes boehmite (AlO(OH)), an open triangle denotes aluminum oxide (alumina), and an open square denotes copper (Cu).

As shown in FIG. 6A, with respect to each of the CP catalyst using a coprecipitation method (CP method), the HP catalyst using a homogeneous precipitation (HP) method, and the SG catalyst using a sol-gel method (SG method), after ten cycles of DSS treatment, a diffraction peak ascribed to a boehmite phase was recognized.

In the number of cycles of DSS treatment shown in FIG. 6A, a Cu crystallite size determined by making a calculation from a comparison of the crystal structure was as small as 14.3 nanometers for the CP catalyst, 20.7 nanometers for the HP catalyst, and 21.0 nanometers for the SG catalyst, and, of these, the size for the CP catalyst was the smallest. In contrast, the Cu crystallite size in the IMP catalyst was 31.8 nanometers, which is even larger than those of the other catalysts.

This difference is caused due to a difference between the catalysts in the degree of reduction of the catalyst particle size, and the above results have confirmed that the CP catalyst can be reduced in particle size to the smallest size.

Figure 6B:
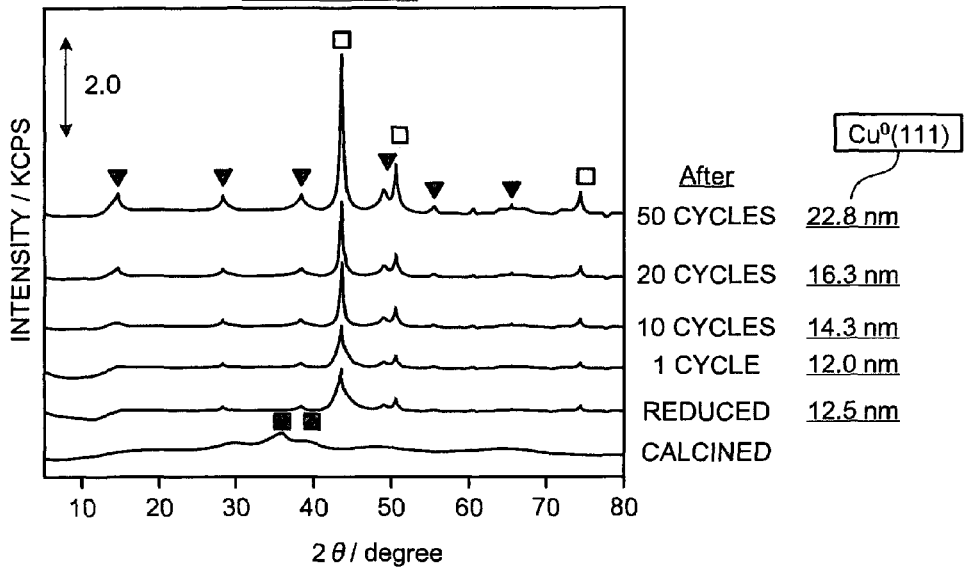
FIG. 6B depicts XRD patterns of a CP catalyst according to the number of cycles of DSS treatment.

FIG. 6B depicts a change of the XRD pattern of the CP catalyst according to the number of cycles of DSS treatment.

In FIG. 6B, a solid triangle denotes boehmite (AlO(OH)), an open square denotes copper (Cu), and a solid square denotes copper oxide (CuO).

A diffraction peak ascribed to a boehmite phase was increased in intensity as the DSS treatment was performed repeatedly, and the change of this peak corresponds to a change of the CO conversion ratio.

Figure 7:
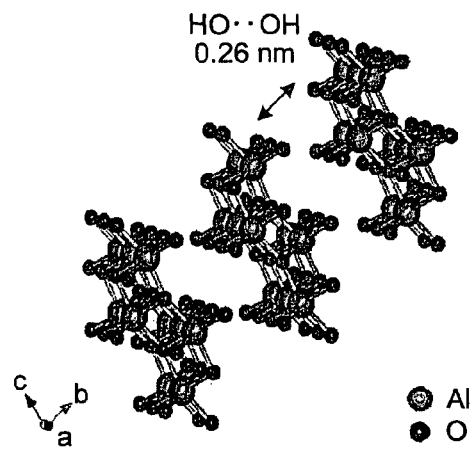
FIG. 7 is a schematic diagram of a structure of boehmite.

FIG. 7 is a schematic diagram of the structure of boehmite.

The CuO recognized by an XRD measurement has a size much larger than the interlayer distance, and therefore is presumed to be a diffraction peak of CuO present on the surface of boehmite. The formation of boehmite causes Cu species having higher durability.

Figure 8:
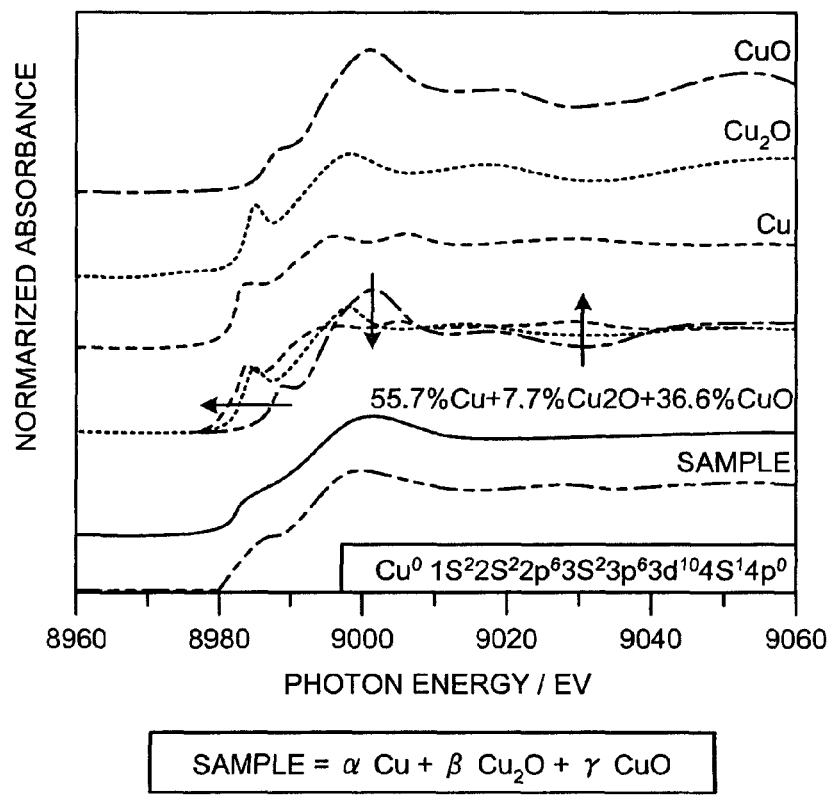
FIG. 8 is a schematic diagram of a method for quantitatively determining a state (valence) of Cu in the catalyst after the reaction by a Q-XAFS method.

FIG. 8 is a schematic diagram of a method for quantitatively determining by a Q-XAFS method a state (valence) of Cu in the catalyst after the reaction.

Figure 9A:
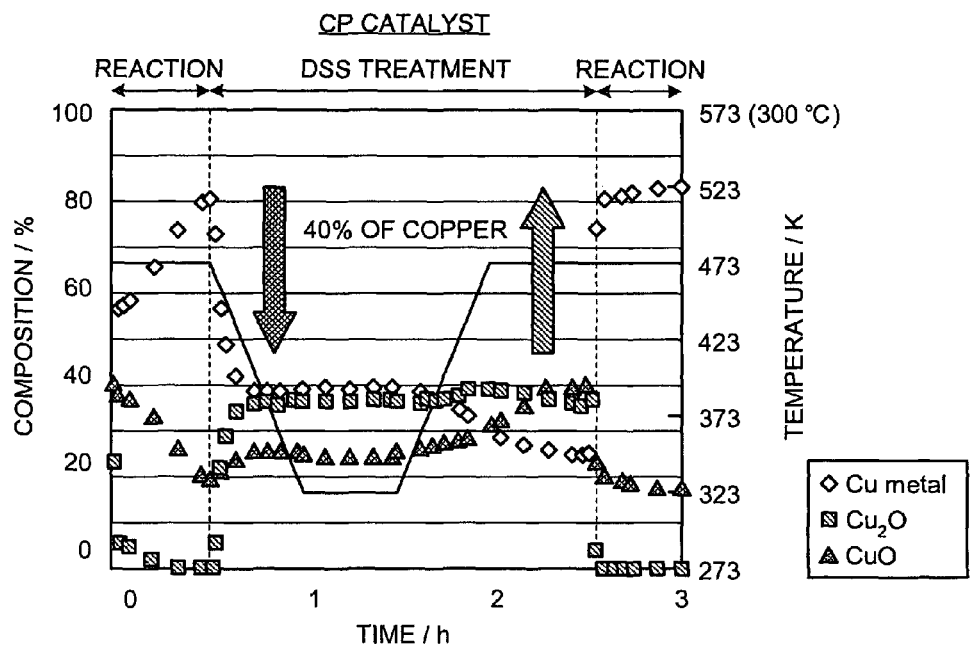
FIG. 9A depicts a change with time of the Cu valence in a CP catalyst determined by a Q-XAFS method.
Figure 9B:
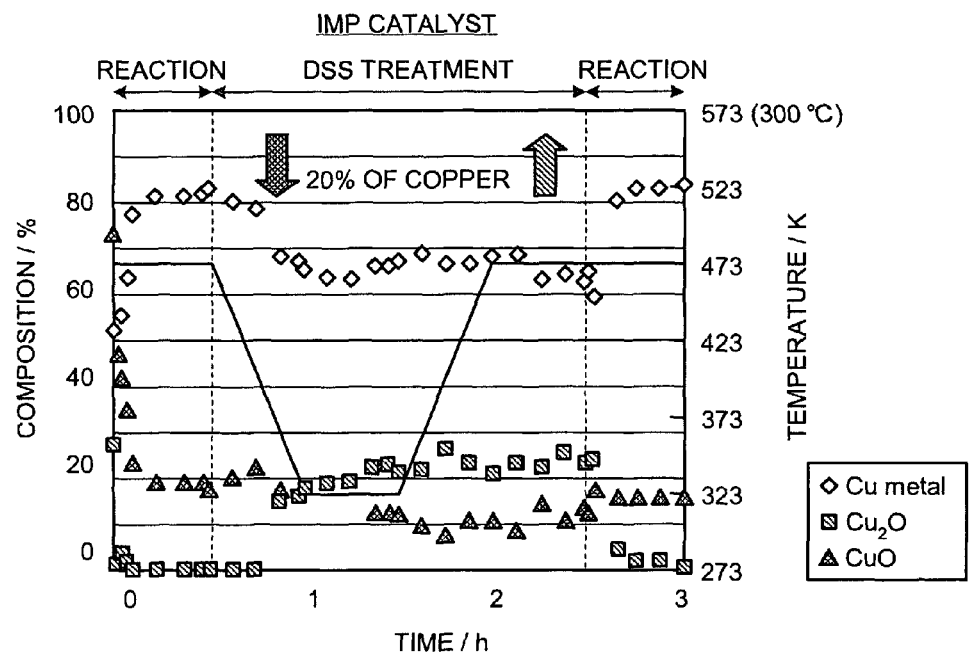
FIG. 9B depicts a change with time of the Cu valence in an IMP catalyst determined by the Q-XAFS method.

With respect to the Cu valence in the catalyst determined by a Q-XAFS method of FIG. 8, changes with time for the CP catalyst and IMP catalyst are shown, respectively, in FIG. 9A and FIG. 9B.

With respect to the CP catalyst, as is apparent from FIG. 9A, 40% of the supported copper easily undergoes oxidation and reduction repeatedly. In contrast, with respect to the IMP catalyst, from FIG. 9B, it is found that only 20% of the copper undergoes oxidation and reduction repeatedly.

Figure 10A:
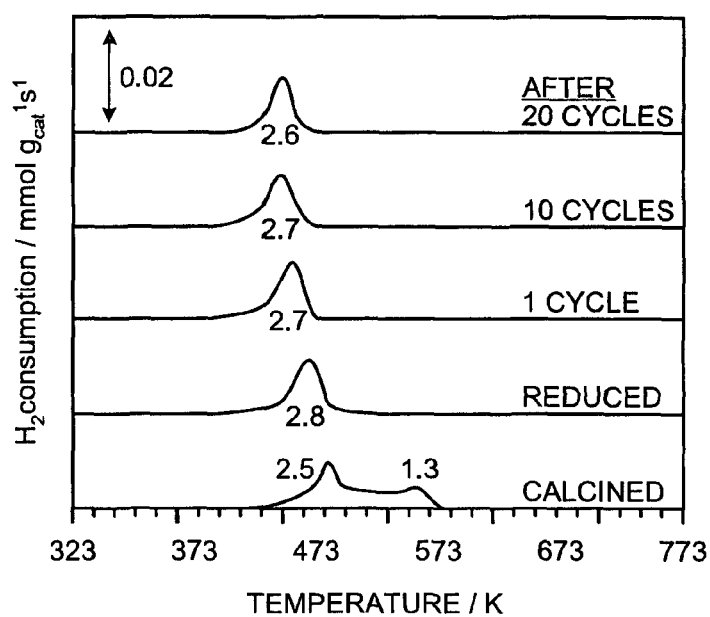
FIG. 10A depicts $H_2$ consumption measured with respect to a temperature using TPR for a CP catalyst after respective steps.
Figure 10B:
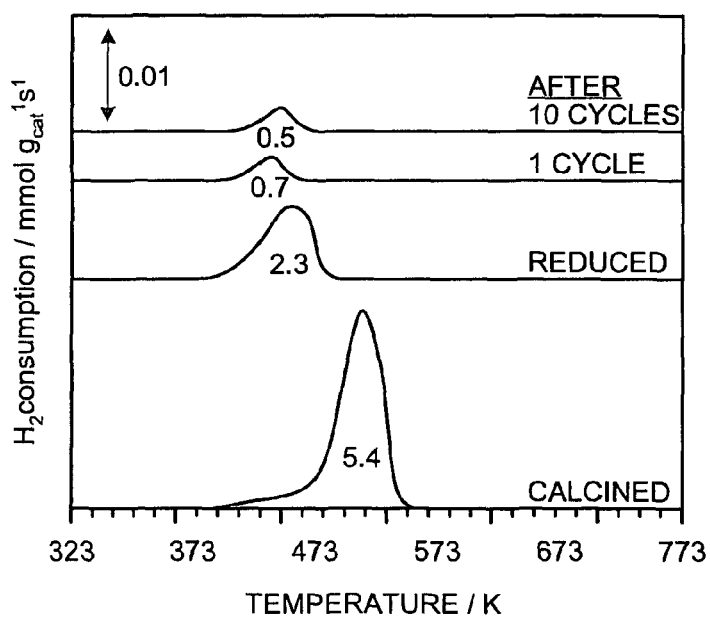
FIG. 10B depicts $H_2$ consumption measured with respect to a temperature using TPR for an IMP catalyst after respective steps.

The results of measurements of the $H_2$ consumption with respect to a temperature using TPR for each catalyst after the respective steps are shown in FIG. 10A (CP catalyst) and FIG. 10B (IMP catalyst).

With respect to the CP catalyst, as the DSS treatment is performed repeatedly, almost no lowering of the reduction peak at about 470 k is found, and the peak gradually shifts to the lower-temperature side. In contrast, with respect to the IMP catalyst, as can be seen from FIG. 10B, the reduction peak at about 470 k is drastically lowered.

As is understood from the above, the catalyst using a CP method is substantially not changed in the amount of copper easily reduced even as the DSS treatment is performed repeatedly, whereas, the catalyst using an IMP method is remarkably reduced in the amount of copper easily reduced. From this, it is apparent that the oxidation-reduction properties of copper also strongly affect the activity and stability of the catalyst.

Figure 11A:
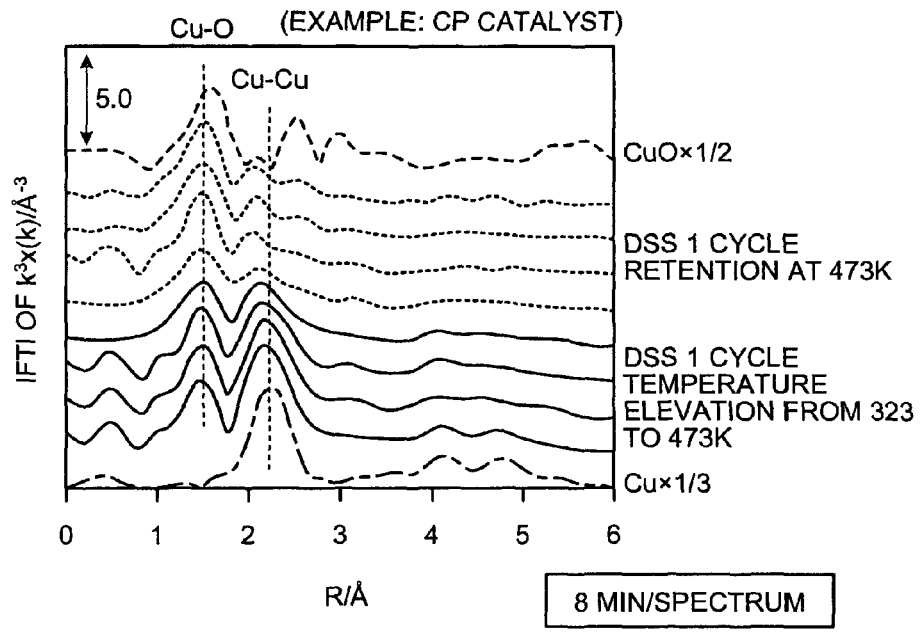
FIG. 11A depicts changes of Cu—O and Cu—Cu with respect to the CP catalyst in a temperature elevation and retention process.
Figure 11B:
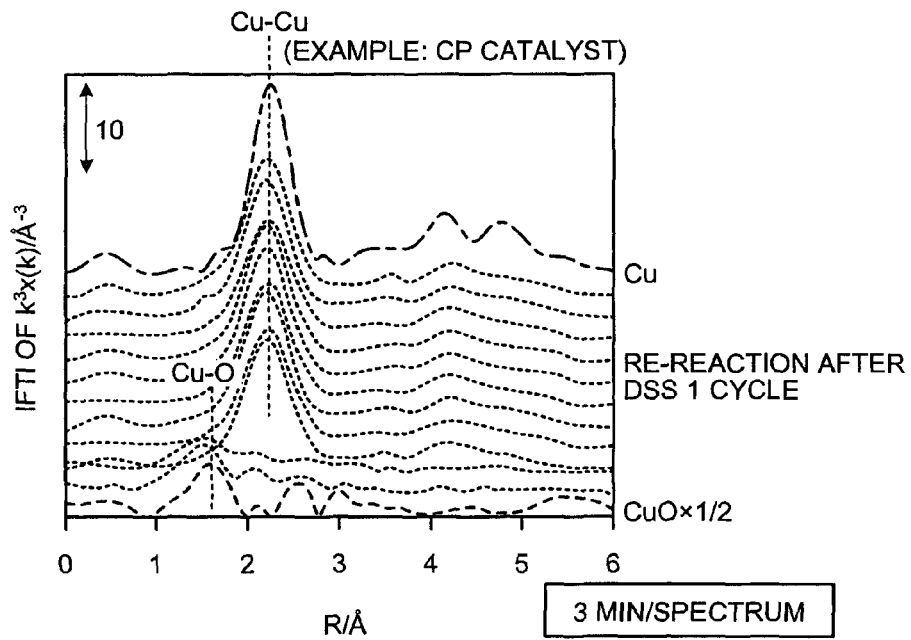
FIG. 11B depicts changes of Cu—O and Cu—Cu with respect to the CP catalyst in a re-reaction process.
Figures 12, 13:
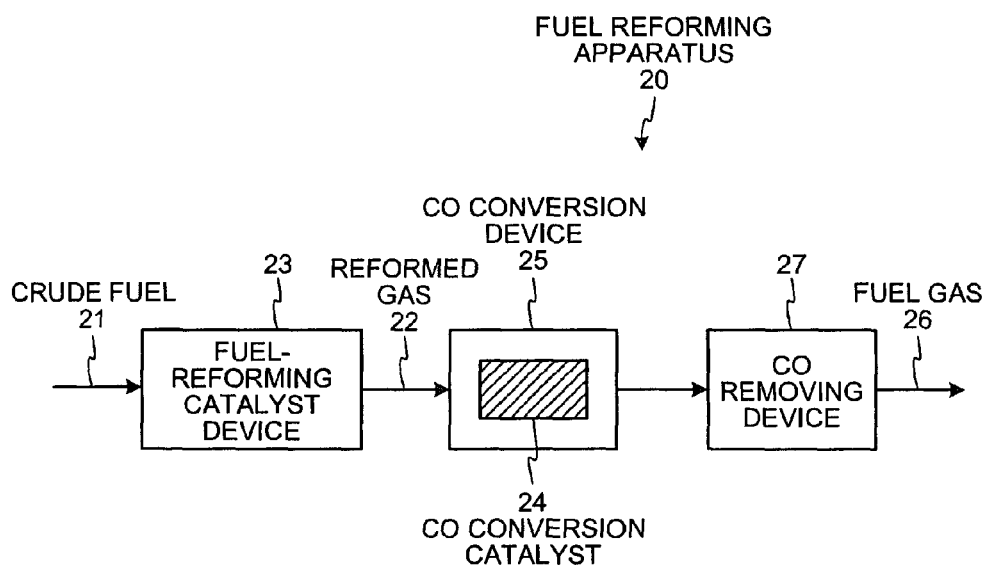
FIG. 12 is a table of changes of the Cu—Cu coordination number measured using a Q-XAFS method with respect to the CP catalyst and IMP catalyst after respective steps.
FIG. 13 is a schematic diagram of a configuration of a fuel reforming apparatus according to a second embodiment of the present invention.

FIG. 11A depicts the CP catalyst in a temperature elevation and retention process, and FIG. 11B depicts the CP catalyst in a re-reaction process. FIG. 12 is a table of changes of the Cu—Cu coordination number measured using a Q-XAFS method with respect to the CP catalyst and IMP catalyst after the respective steps.

From these results, it is found that almost no sintering proceeds in the CP catalyst as the DSS treatment is performed repeatedly, whereas sintering proceeds in the IMP catalyst. Further, it is found that copper on the sample prepared by a CP method has high stability.

A fuel reforming apparatus according to a second embodiment of the present invention is described with reference to FIG. 13.

FIG. 13 is a schematic diagram of a configuration of a fuel reforming apparatus used in the second embodiment.

As shown in FIG. 13, a fuel reforming apparatus 20 according to the second embodiment has a fuel-reforming catalyst device 23 that reforms crude fuel 21 containing hydrocarbon for fuel cell to form reformed gas 22, a CO conversion device 25 that converts CO generated by the reforming in a CO conversion catalyst 24 according to the present invention, and a CO removing device 27 that removes the remaining CO to form fuel gas 26.

For example, when the crude fuel 21 includes city gas (having methane as a main component) or LPG (having propane as a main component), the fuel reforming apparatus 20 first removes a sulfur component (S component) that causes an odor.

A reaction represented by the formula (8) below is then effected at about 700° C. using the reforming catalyst for the fuel-reforming catalyst device 23 to obtain the reformed gas 22 containing hydrogen.

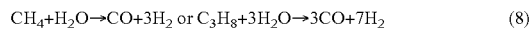

$$CH_4+H_2O \rightarrow CO+3H_2 \text{ or } C_3H_8+3H_2O \rightarrow 3CO+7H_2 \tag{8}$$

The obtained reformed gas 22 contains a great amount of carbon monoxide (CO), and the carbon monoxide (CO) serves as a poisoning substance which inhibits an electrode reaction in a fuel cell. For this reason, in the CO conversion catalyst 24 for the CO conversion device 25 at the subsequent step, a shift reaction is caused at about 200 to 450° C. to convert carbon monoxide (CO) to carbon dioxide ($CO_2$).

In the reformed gas 22 which has passed through the CO conversion device 25, carbon monoxide (CO) is removed and reduced generally to a level of about 3,000 to 4,000 parts per million (ppm), however, the fuel gas 26 to be fed to a fuel cell body is required to have a CO concentration of generally 50 ppm or less, preferably 20 ppm or less, and, if the reformed gas having the above high CO concentration is fed to a fuel cell, the fuel cell is poisoned. Therefore, the CO removing device 27 having a CO removing catalyst is provided downstream of the CO conversion device 25 to further remove carbon monoxide (CO) from the reformed gas.

In the CO removing catalyst of the CO removing device 27, for further reducing CO in the gas in a concentration of 3,000 to 4,000 ppm, a catalytic reaction represented by the formula (9) or formula (10) below, or both the formula (9) and formula (10) below is performed. By this reaction, the remaining CO, which has been reduced in concentration to 3,000 to 4,000 ppm by the CO conversion catalyst 24 provided in the CO conversion device 25, is further reduced in CO concentration to about 10 to 20 ppm or 10 ppm or less.

$$CO+\tfrac{1}{2}O_2 \rightarrow CO_2 \tag{9}$$

$$CO+3H_2 \rightarrow CH_4+H_2O \tag{10}$$

The obtained hydrogen-containing gas having a reduced CO concentration is fed to a fuel cell and utilized in an electrode reaction at the anode side.

In the fuel cell, an anode electrocatalyst at the anode changes hydrogen from $H_2$ to $2H^+$ and $2e^-$, so that $H^+$ diffuses through the electrolyte and electrons travel on lines between the electrodes. On the other hand, a cathode electrocatalyst at the cathode causes $H_2O$ from $H^+$, electrons, and oxygen. These reactions constitute together a cell reaction, making it possible to obtain electromotive force.

The fuel reforming apparatus 20 uses, as the CO conversion catalyst 24, a CO conversion catalyst for fuel cell, which has Cu—Mn prepared by a coprecipitation method, and which has a boehmite phase formed from Cu and Al as active metals in the catalyst. The CO conversion catalyst is prevented from sintering of copper, and achieves improved durability with respect to the function of the CO conversion catalyst, obtaining an advantage in that the improved durability of catalyst extends a life span of the fuel reforming apparatus 20.

With respect to the operation method for the fuel reforming apparatus in the second embodiment, for example, an operation method in a DSS operation can be employed, however, the operation method is not limited thereto, and for example, an operation method in which startup and shutdown are performed repeatedly or an operation method in which startup and shutdown are appropriately performed can be employed.

Figure 14:
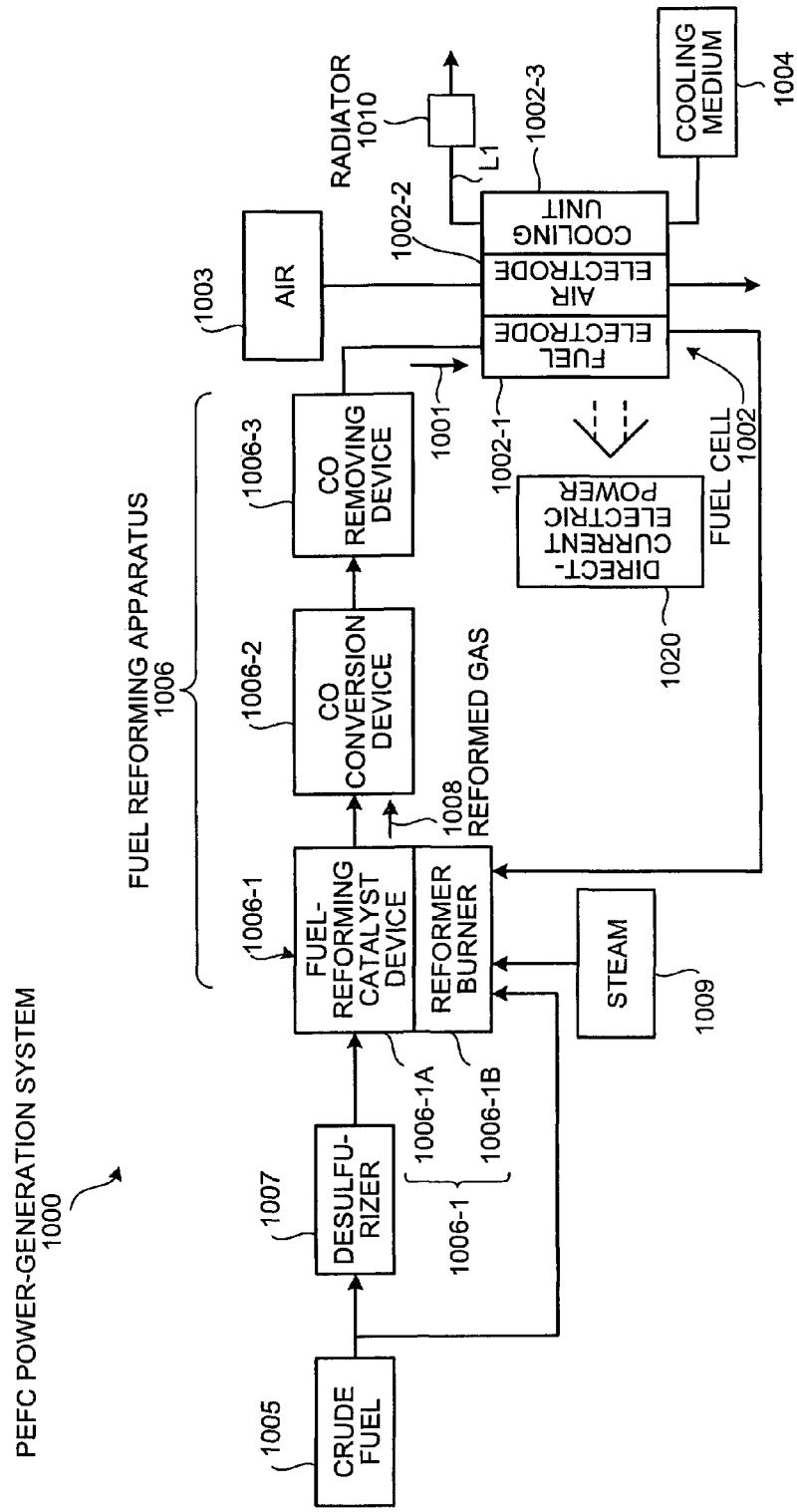
FIG. 14 is a conceptual diagram of a PEFC-type fuel-cell system.

A fuel cell system using a fuel reforming apparatus according to a third embodiment of the present invention is described below with reference to FIG. 14. FIG. 14 is a schematic diagram of a PEFC-type fuel-cell system. Configurations of the fuel reforming apparatus according to the third embodiment are the same as those in the second embodiment, and therefore redundant explanations thereof will be omitted.

As shown in FIG. 14, a power generation system using a PEFC-type fuel cell (PEFC power-generation system) 1000 according to the third embodiment includes a fuel cell 1002 which has a fuel electrode 1002-1 to which fuel gas 1001 is fed, an air electrode 1002-2 to which air 1003 is fed, and a cooling unit 1002-3 to which a cooling medium 1004 is fed to remove heat generated due to an electrochemical reaction during the operation, and a fuel reforming apparatus 1006 that reforms crude fuel 1005 to form the fuel gas 1001 to be fed to the fuel electrode 1002-1, and the system generates electricity by the fuel fed to the fuel electrode 1002-1 to obtain a direct-current electric power 1020 from the fuel cell 1002. The PEFC power-generation system 1000 fully automatically performs startup, power generation, shutdown, alarming, and protection of the fuel cell by a control system (not shown).

With respect to the crude fuel 1005 to be reformed by the fuel reforming apparatus 1006, for example, city gas, LPG gas, or kerosine is used, and a desulfurizer 1007 for removing a sulfide from the crude fuel is provided.

The crude fuel 1005 is reformed by the fuel reforming apparatus 1006. The reforming of the crude fuel 1005 is made mainly by a steam reforming reaction caused in a reforming catalyst (not shown) for a fuel-reforming catalyst device 1006-1A in the fuel reforming apparatus 1006. Specifically, the crude fuel 1005 and steam 1009 are mixed and allowed to flow over the reforming catalyst layer, and, using a reformer burner 1006-1B, for example, at a temperature of 700 to 800° C., a steam reforming reaction (for example, $CH_4 + H_2O \rightarrow CO + 3H_2$ when using city gas) is caused to reform the crude fuel. As an example of the reforming catalyst, while there can be mentioned $Ru/Al_2O_3$, the reforming catalyst is not limited thereto. Reformed gas 1008 subsequently passes through the above-mentioned CO conversion device 1006-2 and CO removing device 1006-3 to form fuel gas 1001. As an example of the CO conversion catalyst for the CO conversion device 1006-2, there can be mentioned a CO conversion catalyst having supported Cu and Mn as active metals, which catalyst is formed by calcining at a low temperature a precursor having Cu and Mn obtained by a coprecipitation method.

In a cooling line L1 for the cooling medium 1004, there is provided a radiator 1010 that conducts heat exchange of water or air to release the heat generated during the fuel-cell power generation. In this system, for example, like the radiator 1010, the heat generated due to the reaction in the fuel cell 1002 is utilized as various heat sources.

Figure 15:
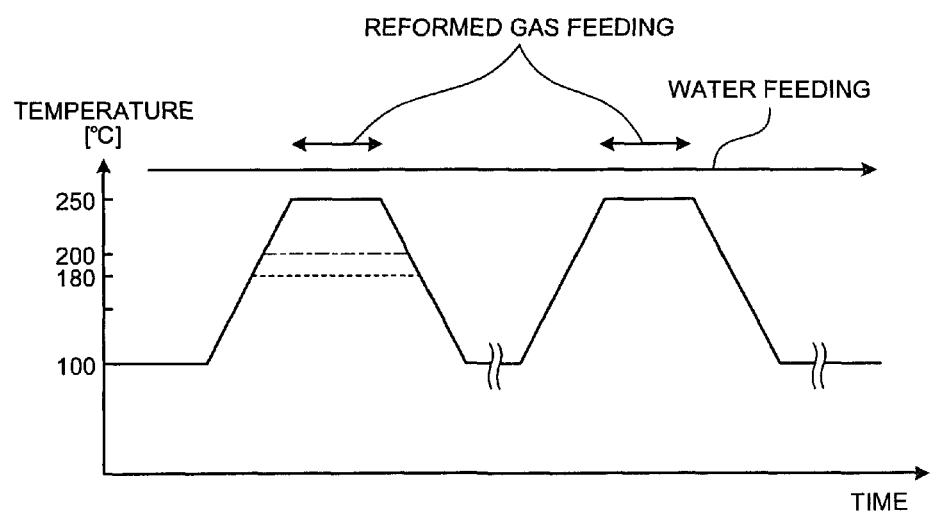
FIG. 15 depicts a pattern of increasing and lowering the temperature for DSS in an Example.

In the system shown in FIG. 15, during the fuel-cell power generation, the crude fuel 1005 is fed to the reformer burner 1006-1B to increase the temperature in the fuel-reforming catalyst device 1006-1A so that predetermined temperature conditions suitable for the steam reforming are achieved, and then the crude fuel 1005 is fed, obtaining the reformed gas 1008. The obtained reformed gas 1008 then passes through the CO conversion device 1006-2 and the CO removing device 1006-3 to form the fuel gas 1001 having CO removed, and the fuel gas is fed to the fuel electrode 1002-1, starting power generation. The gas discharged from the fuel electrode 1002-1 is fed to the reformer burner 1006-1B and burned for utilizing the unreacted gas.

In the present power generation system using a PEFC-type fuel cell, as the CO conversion catalyst for the CO conversion device 1006-2, a CO conversion catalyst having a boehmite phase formed from Cu and Al as active metals in the catalyst is used, and the CO conversion catalyst is prevented from suffering sintering of copper, and achieves improved durability with respect to the function of the CO conversion catalyst, so that the improved durability of catalyst extends a life span of the fuel reforming apparatus, making it possible to provide a fuel cell system which operates with high stability and high reliability over a long period of time.

EXAMPLES

While Examples of the present invention that describe the effects of the present invention are described below, the invention is not limited thereto.

Example 1 (Catalyst 1)

Method for Preparing a Catalyst of Cu and Al Added

In this Example, a catalyst of Cu/Al was prepared.

A method for preparing a catalyst in this Example is described below.

15 liters of ion-exchanged water was placed in a cylindrical container made of PE, and to the ion-exchanged water were added 101.15 grams of copper nitrate trihydrate (molecular weight: 241.6) and 319.0 grams of aluminum nitrate nonahydrate (molecular weight: 375.13), and they were dissolved by stirring (solution A).

Solution A was prepared and a 10 wt % aqueous sodium carbonate solution was dropped to solution A while stirring to precipitate Cu and Al, and the pH of the solution was adjusted to 9.0.

For rendering the state of the precipitate uniform and stable, the resultant solution was matured while stirring.

The pH of the solution was adjusted to about 9.0, and then solution A was stirred for about 1.0 hour while maintaining solution A at that pH, obtaining a precipitate slurry which is a precursor having a crystal structure of Cu and Al.

The obtained slurry was collected by a centrifugal separator, and washed with distilled water to remove excess Na ions, and then dried at 110° C. overnight to such an extent that the dried product was able to be pulverized. The resultant slurry was then calcined in the atmosphere at 550° C. for 3 hours to obtain catalyst 1 having Cu and Al of Example 1.

Catalyst 1 had a Cu:Al ratio of 1:2 (molar ratio).

Comparative Example 1 (Comparative Catalyst 1)

Method for Preparing a Conventional Cu/Al Catalyst Using an Impregnation Method

With respect to comparative catalyst 1 of Comparative Example 1, a conventional Cu/Al catalyst using an impregnation method was used.

37.5 grams of aluminum nitrate ($Al(NO_3)_3 \cdot 9H_2O$; molecular weight: 375.13) was added to 1 liter of water, and the resultant mixture was heated to 60° C. to dissolve aluminum nitrate in water, obtaining an aqueous aluminum nitrate solution. To the obtained solution was added aqueous ammonia so that the pH of the solution became 7, forming an aluminum hydroxide precipitate. After the resultant precipitate was matured for one hour, it was washed with water and collected by filtration, followed by drying and then calcining at 550° C. for 5 hours to obtain $\gamma\text{-}Al_2O_3$ (carrier 1).

To the obtained carrier 1 (8.5 g) was dropped an aqueous copper nitrate ($Cu(NO_3)_2 \cdot 3H_2O$) solution while stirring so that the carrier was uniformly impregnated with the Cu solution. The aqueous Cu solution was added dropped in an amount of 1.5 grams, in terms of CuO, and then the resultant mixture was subjected to evaporation to dryness at 110° C. while stirring, evaporating the moisture for 24 hours. The sample obtained after the evaporation was calcined in air at 500° C. for 5 hours to obtain comparative catalyst 1 ($CuO/\gamma\text{-}Al_2O_3$). Comparative catalyst 1 had a $CuO:Al_2O_3$ ratio of 15:85 (weight ratio)

<Evaluation of Catalyst Performance>

With respect to each of the above-obtained catalyst 1 in the Example and comparative catalyst 1 in the Comparative Example, a catalytic activity was evaluated using a flow microreactor.

A tubular reactor having an inner diameter of 20 millimeters was packed with 15.8 cubic centimeters of a catalyst, and the catalyst performance was evaluated. With respect to the catalyst performance, a CO conversion ratio (%) was determined from a change of the gas flow rate between the inlet and outlet of the catalyst layer by making a calculation using the mathematical formula shown below.

Data was obtained in terms of a parameter defined as "CO conversion ratio" which corresponds to a change of the gas composition between the inlet and outlet of the catalyst layer.

The gas composition and flow rate were controlled by a mass flow controller, and the catalyst layer temperature was controlled by an electric furnace.

$$\text{CO conversion ratio (\%)} = \{(1-(\text{CO gas flow rate at catalyst layer outlet (mol/h)})/(\text{CO gas flow rate at catalyst layer inlet (mol/h)})\} \times 100$$

<Reaction Conditions>

A reduction treatment for the catalyst, which is an activation treatment, was conducted under conditions such that $CO/CO_2/H_2/H_2O$ at 200° C. was allowed to flow at 23.6 L/h for 30 minutes.

Conditions for the activity evaluation used in the examples were such that the catalyst amount was 10 cubic centimeters, the GHSV (gas hourly space velocity) was 700 $h^{-1}$, and the composition of the gas fed was $H_2/CO/CO_2$ (mol/mol/mol).

As shown in FIG. 15, three types of tests for DSS were performed, specifically, by increasing and lowering the temperature in an electric furnace from 100 to 250° C., from 100 to 200° C., and from 100 to 180° C., and a CO conversion ratio (%) according to the number of DSS cycles was measured.

Figure 16:
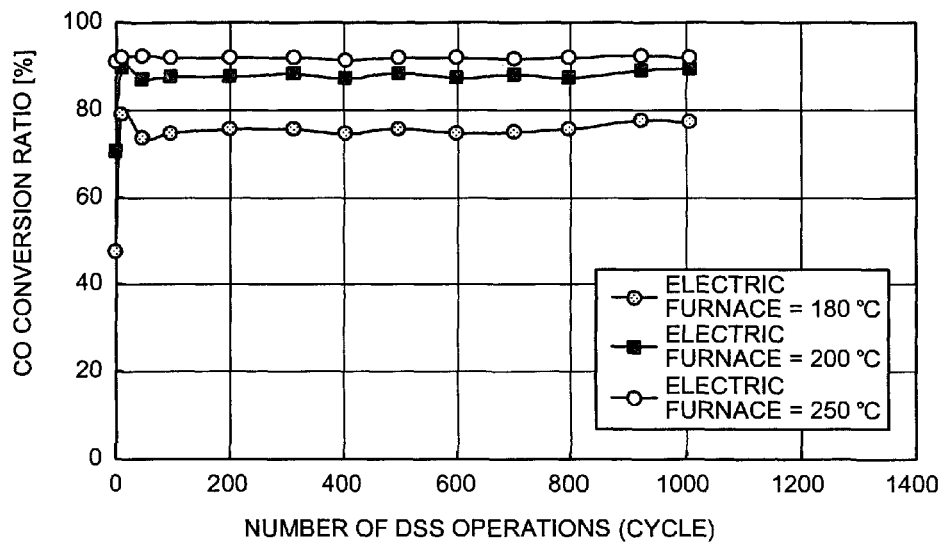
FIG. 16 is a graph of a relationship between the number of DSS cycles and a CO conversion ratio for the CO conversion catalyst using a coprecipitation method in the Example.
Figure 17:
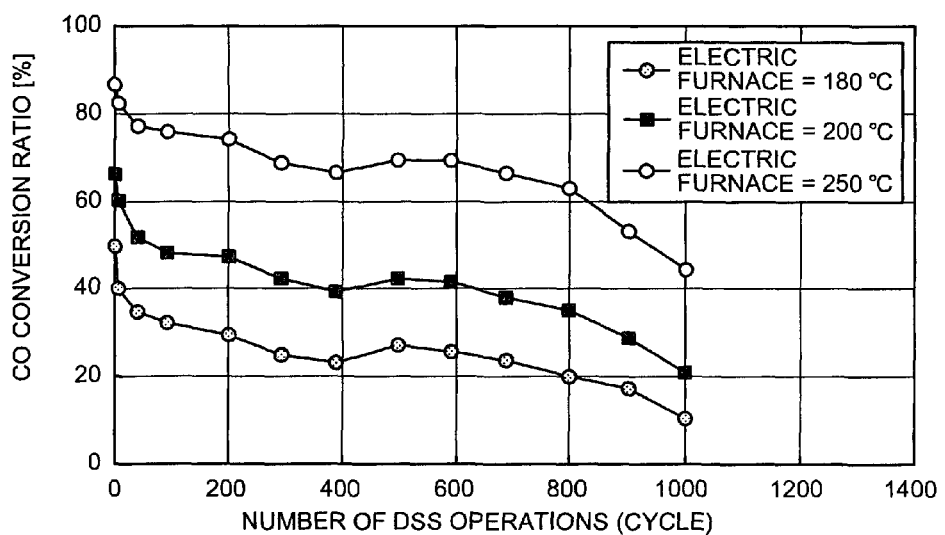
FIG. 17 is a graph of a relationship between the number of DSS cycles and a CO conversion ratio for the CO conversion catalyst using an impregnation method in a Comparative Example.
Figure 18:
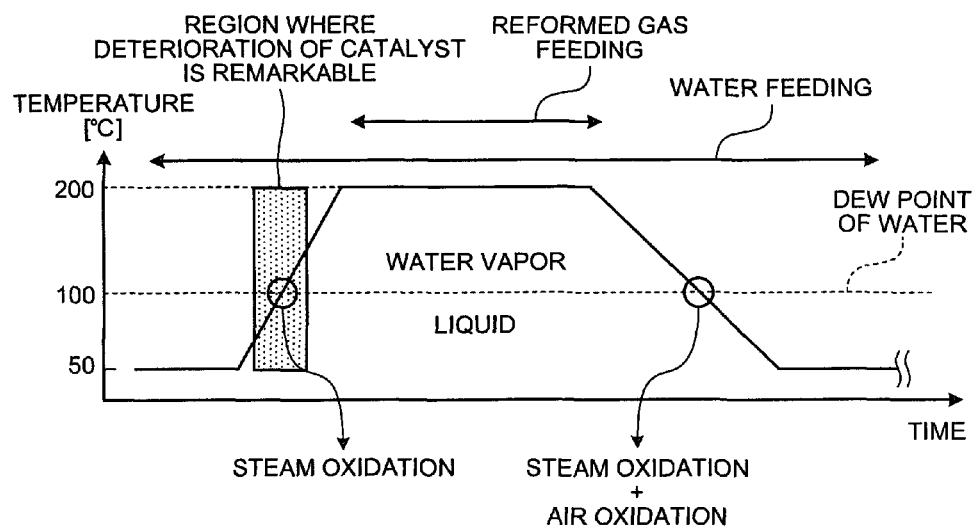
FIG. 18 is a schematic diagram for explaining a change of a state of water as a temperature of a catalyst layer is increased or lowered.

The results are shown in FIGS. 16 and 17.

With respect to the evaluation of durability of the CO conversion catalyst, as shown in FIG. 16, it was found that, as a cycle of increasing and lowering the temperature of the catalyst layer was repeated about 1,000 times, the value of CO conversion ratio (%) in Example 1 was substantially constant. Further, it was found that the CO conversion ratio (%) was improved in the initial stage of DSS. The reason for this is presumed that, as a cycle of increasing and lowering the temperature was repeated many times, a boehmite phase is formed due to steam present in the gas to cause a structure of Cu fine particles and prevent aggregation of the Cu fine particles, so that the CO conversion ratio is improved, making it possible to stabilize the performance of the catalyst for a long period of time.

By contrast, in Comparative Example 1 using comparative catalyst 1 which is a conventional Cu/Al catalyst, as shown in FIG. 17, it was found that the CO conversion ratio was gradually reduced as a cycle of increasing and lowering the temperature of the catalyst layer was repeated many times. Even in the cycle of increasing the temperature to a temperature as low as 180° C., when the cycle was repeated 800 times or more, the CO conversion ratio was reduced to 60% or less.

The CO conversion catalyst according to the present invention has a boehmite phase formed therein, and has an improved degree of dispersion of Cu metal by the boehmite phase, and hence can be prevented from sintering of copper caused due to steam, achieving improved durability with respect to the function of the CO conversion catalyst. Therefore, the CO conversion catalyst according to the present invention can be applied to a CO conversion catalyst for use in a fuel cell in a DSS operation, particularly, in which the fuel cell is operated at high temperatures or operated as the temperature is increased and lowered repeatedly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A carbon monoxide conversion catalyst for use in a daily startup and shutdown operation of a fuel cell, comprising an amorphous Cu—Al-Ox catalyst which includes a boehmite phase formed in at least a part of the Cu—Al-Ox catalyst which is obtainable by
   individually dropping solutions of respective nitrates of Cu and Al to ion-exchanged water, stirring to dissolve, and adding a precipitant to the resultant solution to precipitate Cu and Al;
   maturing the solution in which Cu and Al are precipitated to form a precursor;
   collecting the obtained catalyst by filtration, after drying, calcining at about 550° C. to give an amorphous Cu—Al-Ox conversion catalyst in which amorphous AlyOx and $Cu^0$ particles are dispersed; and
   exposing the calcined CO conversion catalyst to a temperature of 50 to 250° C. in a satured stream atmosphere at 70° C. or higher to form a boehmite phase in a part of the amorphous catalyst.

2. The CO conversion catalyst according to claim 1, wherein the Cu—Al-Ox catalyst is formed by any one of a homogeneous precipitation method, a coprecipitation method, and a sol-gel method, and then treated with steam-containing gas.

3. The CO conversion catalyst according to claim 1, wherein the Cu—Al-Ox catalyst has a Cu:Al molar ratio of 4:1 to 1:4.

4. The CO conversion catalyst according to claim 1, further comprising, as an active component, at least one member selected from a group consisting of Mn, Fe, Co, Cr, and Ni.

5. The CO conversion catalyst according to claim 1, wherein the Cu—Al-Ox catalyst is calcined at a temperature of 300 to 600° C.

6. The CO conversion catalyst according to claim 1, wherein the $Cu^0$ particles are from 1.20 to 1.93 times as large as the boehmite phase.

7. A fuel cell system in a daily startup and shutdown operation using a hydrocarbon fuel, the system comprising:
   reformer that reforms the hydrocarbon fuel to produce a reformed gas;
   the CO conversion catalyst according to claim 1 for removing carbon monoxide from the reformed gas; and
   a fuel cell that generates electricity.

8. A method for producing a carbon monoxide conversion catalyst for use in a daily startup and shutdown operation of a fuel cell, the method comprising:
   individually dropping solutions of respective nitrates of Cu and Al to ion-exchanged water, stirring to dissolve, and adding a precipitant to the resultant solution to precipitate Cu and Al;
   maturing the solution in which Cu and Al are precipitated to form a precursor;
   collecting the obtained catalyst by filtration, after drying, calcining at about 550° C. to give an amorphous Cu—Al-Ox conversion catalyst in which amorphous AlyOx and $Cu^0$ particles are dispersed; and
   exposing the calcined CO conversion catalyst to a temperature of 50 to 250° C. in a satured stream atmosphere at 70° C. or higher to form a boehmite phases in a part of the amorphous catalyst
   wherein the $Cu^0$ particles are from 1.20 to 1.93 times as large as the boehmite phases.

9. The method according to claim 8, wherein the Cu—Al-Ox catalyst is formed by any one of a homogeneous precipitation method, a coprecipitation method, and a sol-gel method, and then treated with steam-containing gas.

10. The method according to claim 8, wherein the Cu—Al-Ox catalyst has a Cu:Al molar ratio of 4:1 to 1:4.

11. The method according to claim 8, further comprising, including, as an active component, at least one member selected from a group consisting of Mn, Fe, Co, Cr, and Ni.

* * * * *